(12) United States Patent
Soejima

(10) Patent No.: US 12,054,910 B2
(45) Date of Patent: Aug. 6, 2024

(54) WORK VEHICLE

(71) Applicant: KOMATSU LTD., Tokyo (JP)

(72) Inventor: Koji Soejima, Tokyo (JP)

(73) Assignee: KOMATSU LTD., Tokyo (JP)

( * ) Notice: Subject to any disclaimer, the term of this patent is extended or adjusted under 35 U.S.C. 154(b) by 339 days.

(21) Appl. No.: 17/426,954

(22) PCT Filed: Mar. 24, 2020

(86) PCT No.: PCT/JP2020/013067
§ 371 (c)(1),
(2) Date: Jul. 29, 2021

(87) PCT Pub. No.: WO2020/196538
PCT Pub. Date: Oct. 1, 2020

(65) Prior Publication Data
US 2022/0098824 A1    Mar. 31, 2022

(30) Foreign Application Priority Data
Mar. 26, 2019  (JP) ................................ 2019-057878

(51) Int. Cl.
*B62D 25/12*        (2006.01)
*E02F 9/08*         (2006.01)
(Continued)

(52) U.S. Cl.
CPC ............ *E02F 9/0891* (2013.01); *B62D 25/12* (2013.01); *E05F 1/1091* (2013.01); *E05F 3/222* (2013.01);
(Continued)

(58) Field of Classification Search
CPC ..... E02F 9/0891; E02F 9/2271; E02F 9/0841; E05F 3/222; E05F 1/1091; B62D 25/10;
(Continued)

(56) References Cited

U.S. PATENT DOCUMENTS 5,645,134 A  *  7/1997  Frankel ................... F02B 77/13
                                            180/69.24
8,646,556 B2    2/2014  Shimada et al.
(Continued)

FOREIGN PATENT DOCUMENTS

CN         102667011 A       9/2012
EP         3 208 126 A1      8/2017
(Continued)

OTHER PUBLICATIONS

The extended European search report for the corresponding European application No. 20777463.9, issued on Oct. 4, 2022.
(Continued)

*Primary Examiner* — Keith J Frisby
(74) *Attorney, Agent, or Firm* — Global IP Counselors, LLP

(57) ABSTRACT

A work vehicle includes a vehicle body frame, an engine hood, a first extendable member, and a second extendable member. The vehicle body frame is configured to support an engine. The engine hood has a cover frame coupled to the vehicle body frame so as to allow opening and closing, and an engine cover attached to the cover frame. The first extendable member is coupled to the vehicle body frame and the cover frame. The first extendable member is disposed at one end side relative to a center in a vehicle width direction of the work vehicle. The second extendable member is coupled to the vehicle body frame and the cover frame. The second extendable member is disposed at an other end side relative to the center in the vehicle width direction of the work vehicle.

6 Claims, 4 Drawing Sheets

(51) Int. Cl.
*E05F 1/10* (2006.01)
*E05F 3/22* (2006.01)

(52) U.S. Cl.
CPC ... *E05Y 2900/518* (2013.01); *E05Y 2900/536* (2013.01)

(58) Field of Classification Search
CPC ............. B62D 25/12; E05Y 2900/518; E05Y 2900/536
See application file for complete search history.

(56) References Cited

U.S. PATENT DOCUMENTS

| | | |
|---|---|---|
| 2004/0084924 A1 | 5/2004 | Albright et al. |
| 2005/0006156 A1 | 1/2005 | Schambach |
| 2008/0006460 A1* | 1/2008 | Giovannini ............... E02F 9/00 180/69.2 |
| 2012/0255801 A1 | 10/2012 | Shimada et al. |
| 2013/0074410 A1 | 3/2013 | Berkeland |
| 2015/0007499 A1 | 1/2015 | Gurusamy et al. |
| 2016/0208457 A1* | 7/2016 | Hartz ..................... E02F 9/0833 |
| 2016/0208528 A1* | 7/2016 | Hartz ..................... E05C 19/00 |

FOREIGN PATENT DOCUMENTS

| | | |
|---|---|---|
| JP | 8-175438 A | 7/1996 |
| JP | 11-131528 A | 5/1999 |
| JP | 2005-186882 A | 7/2005 |
| JP | 2009-101747 A | 5/2009 |
| JP | 2009-262727 A | 11/2009 |
| JP | 2011-153427 A | 8/2011 |
| JP | 2013-35307 A | 2/2013 |
| JP | 2015-223993 A | 12/2015 |
| JP | 2017-87919 A | 5/2017 |

OTHER PUBLICATIONS

The Office Action for the corresponding Chinese application No. 202080010086.X, issued on Oct. 31, 2022.
The International Search Report for the corresponding international application No. PCT/JP2020/013067, issued on Jun. 9, 2020.

* cited by examiner

WORK VEHICLE

CROSS-REFERENCE TO RELATED APPLICATIONS

This application is a U.S. National stage application of International Application No. PCT/JP2020/013067, filed on Mar. 24, 2020. This U.S. National stage application claims priority under 35 U.S.C. § 119(a) to Japanese Patent Application No. 2019-057878, filed in Japan on Mar. 26, 2019, the entire contents of which are hereby incorporated herein by reference.

BACKGROUND

Field of the Invention

The present invention relates to a work vehicle.

Background Information

Conventionally, a work vehicle is known that is provided with a vehicle body frame that supports an engine, a cover frame coupled to the vehicle body frame so as to allow opening and closing, and an engine cover that is attached to the cover frame and covers the engine. The cover frame and the engine cover constitute an engine hood.

In the work vehicle described in US 2005/006156, one extendable member coupled to the vehicle body frame and the engine hood is provided for the purpose of easily opening and closing the engine hood. The extendable member is coupled to either one of the left side and the right side of the engine hood.

SUMMARY

However, in the work vehicle described in US 2005/006156, the engine hood is cantilevered because the engine hood is supported on only one side by the extendable member. As a result, shaking or deformation of the engine hood may easily occur while the engine hood is open or while opening and closing the engine hood. As a result, there is a concern that the engine hood may come into contact with peripheral members.

An object of the present invention is to provide a work vehicle with which shaking or deformation of the engine hood is suppressed.

A work vehicle is provided with a vehicle body frame, an engine hood, a first extendable member, and a second extendable member. The vehicle body frame supports an engine. The engine hood has a cover frame coupled to the vehicle body frame so as to allow opening and closing, and an engine cover that is attached to the cover frame and covers the engine. The first extendable member is coupled to the vehicle body frame and the cover frame and is disposed at a first end side based on the center in the vehicle width direction of the work vehicle. The second extendable member is coupled to the vehicle body frame and the cover frame and is disposed at a second end side opposite the first end side based on the center in the vehicle width direction of the work vehicle.

According to the present invention, there is provided a work vehicle with which shaking or deformation of the engine hood is suppressed.

DETAILED DESCRIPTION OF EMBODIMENT(S)

A wheel loader 1 according to an embodiment of the present invention will be explained below with reference to the drawings. The wheel loader 1 is an example of a "work vehicle" according to the present invention.

In the following explanations, "up," "down," "front," "rear," "left," and "right" indicate directions relative to a state of looking forward from the driver's seat. The "up-down direction" signifies the vertical direction. The "front-back direction" signifies the front-back direction of the vehicle. The "vehicle width direction" signifies the left-right direction of the vehicle.

(Wheel Loader 1)

Figure 1:
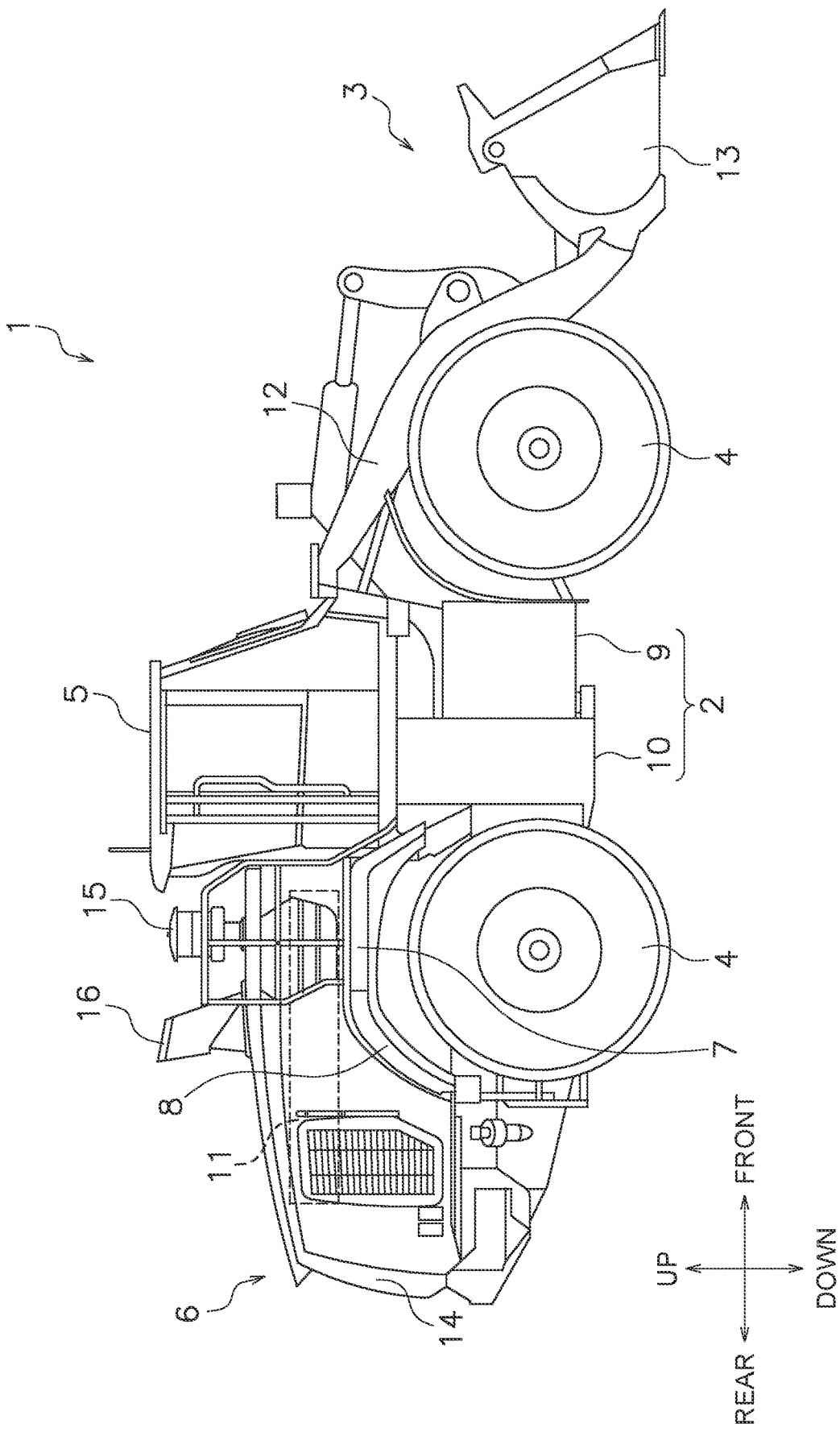
FIG. 1 is a side view of a wheel loader according to an embodiment.

FIG. 1 is a side view seen from the right side of the wheel loader 1 according to the embodiment.

The wheel loader 1 is provided with a vehicle body frame 2, a work implement 3, a plurality of traveling wheels 4, a cab 5, an engine hood 6, a pair of left and right steps 7 (only the step 7 on the right side is depicted in FIG. 1), and a pair of left and right fenders 8 (only the fender 8 on the right side is depicted in FIG. 1).

The vehicle body frame 2 is an articulated type and includes a front frame 9 and a rear frame 10. The front frame 9 is disposed in front of the rear frame 10. An engine 11 is mounted to the rear frame 10.

The work implement 3 is mounted to a front part of the front frame 9. The work implement 3 includes a boom 12 and a bucket 13. The boom 12 is rotatably attached to the front frame 9. The bucket 13 is rotatably attached to the tip of the boom 12.

A pair of the traveling wheels 4 are attached to the left and right of the front frame 9. A pair of the traveling wheels 4 are attached to the left and right of the rear frame 10.

The cab 5 is disposed on the rear frame 10. The operator's seat, various operating members, and a display device, etc. are disposed inside the cab 5.

The engine hood 6 is coupled to the rear frame 10. The engine hood 6 covers an engine room in which the engine 11 is installed. As illustrated in FIG. 1, the engine hood 6 has an engine cover 14, an intake pipe 15, and an exhaust pipe 16.

The engine cover 14 covers the engine 11. While the constituent material of the engine cover 14 is not limited, a resin material, for example, can be used. The engine cover 14 according to the present embodiment extends in the front-back direction as seen from the side. The length of the engine cover 14 in the front-back direction is greater than the height in the up-down direction.

The intake pipe 15 is a member for taking in air to be supplied to the engine 11. The intake pipe 15 protrudes upward from the engine cover 14. The intake pipe 15 is disposed in front of the exhaust pipe 16.

The exhaust pipe 16 is a member for releasing exhaust gas from the engine 11. The exhaust pipe 16 protrudes upward from the engine cover 14. The exhaust pipe 16 is disposed behind the intake pipe 15.

An internal structure of the engine hood 6 is explained below.

The steps 7 are disposed above the traveling wheels 4 attached to the rear frame 10. The steps 7 may be used for inspection work performed by a worker.

The fenders 8 are disposed above and to the rear of the traveling wheels 4 attached to the rear frame 10. The fenders 8 are disposed so as to extend to the rear from the rear end of the steps 7. The fenders 8 are attached to the engine cover 14.

(Internal Structure of Engine Hood 6)

Figure 2:
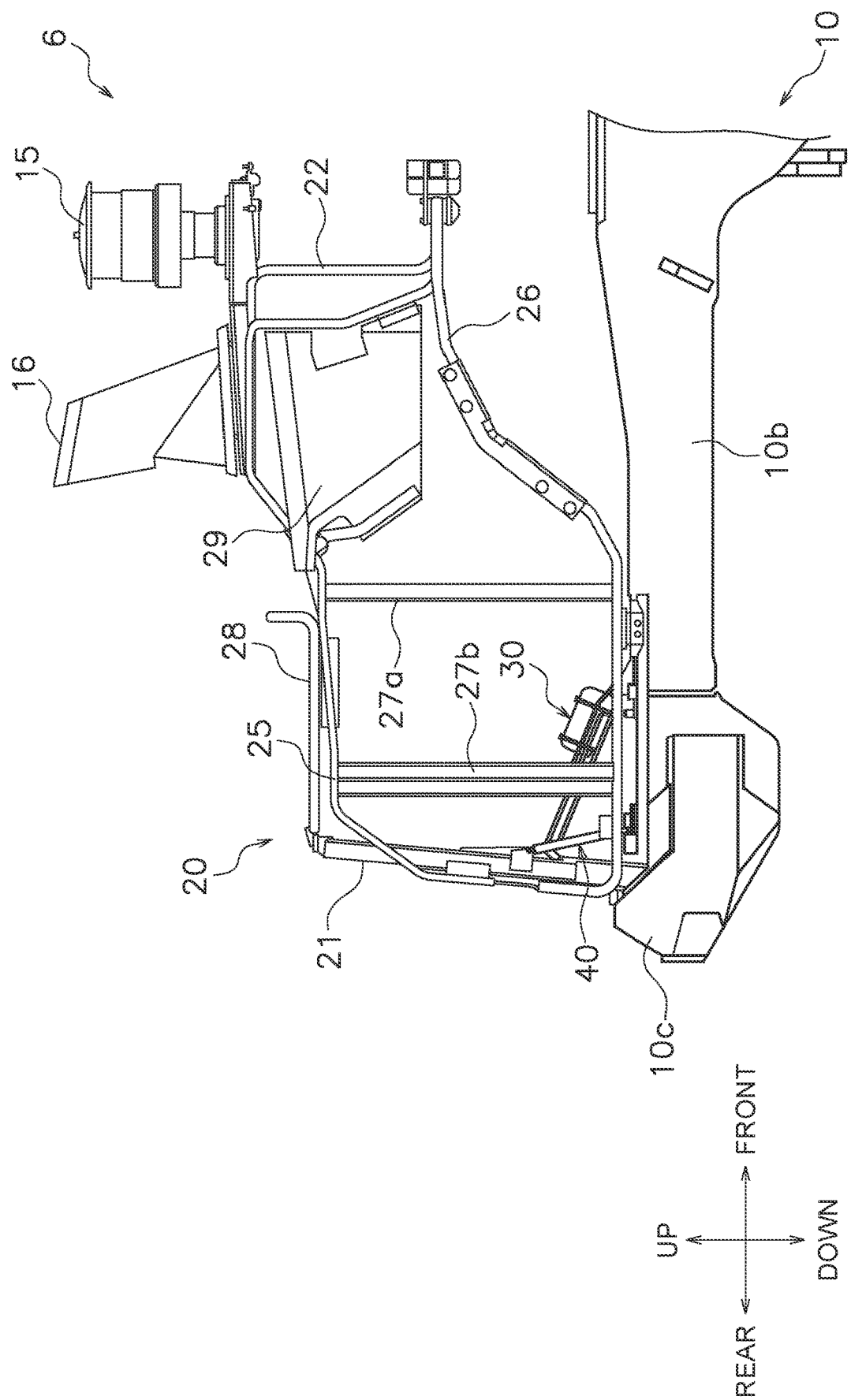
FIG. 2 is a side view illustrating a closed state of an engine hood according to the embodiment.
Figure 3:
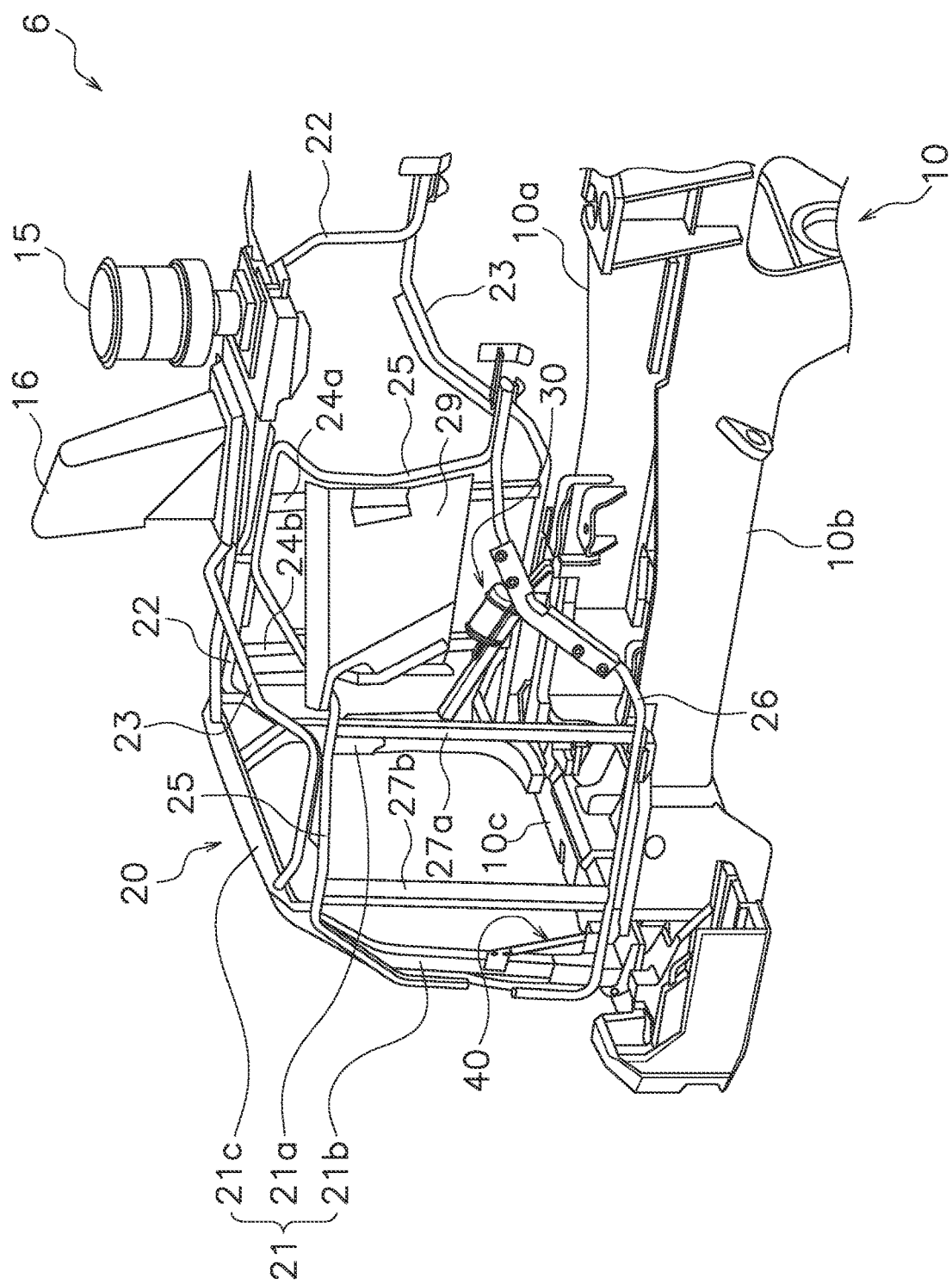
FIG. 3 is a perspective view illustrating the closed state of the engine hood according to the embodiment.
Figure 4:
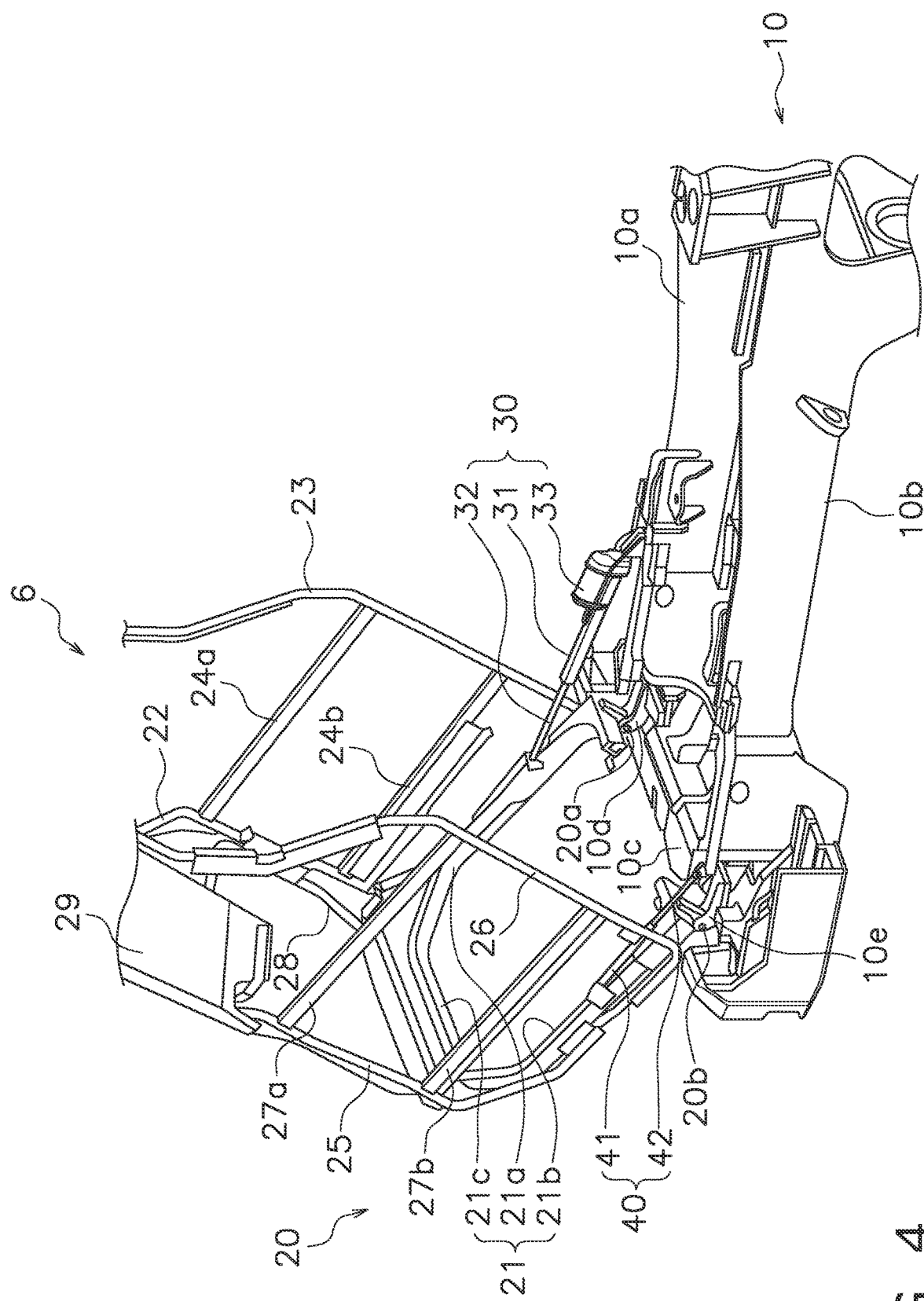
FIG. 4 is a perspective view illustrating an open state of the engine hood according to the embodiment.

FIG. 2 is a side view illustrating, from the right side, the engine hood 6 to which the engine cover 14 is attached. FIG. 3 and FIG. 4 are perspective views illustrating, from the right side, the engine hood 6 to which the engine cover 14 is attached. A state in which the engine hood 6 is closed is depicted in FIGS. 2 and 3, and a state in which the engine hood 6 is open is depicted in FIG. 4.

As illustrated in FIGS. 2 to 4, the engine hood 6 has a cover frame 20, an electric cylinder 30 (an example of a first extendable member), and a gas damper 40 (example of a second extendable member).

1. Cover Frame 20

The engine cover 14 (see FIG. 1) is attached to the cover frame 20. The cover frame 20 is disposed on the rear frame 10. The rear frame 10 has a left beam 10a, a right beam 10b, and a rear beam 10c. The left beam 10a extends from a left end part of the rear beam 10c toward the front. The right beam 10b extends from a right end part of the rear beam 10c toward the front. The rear beam 10c is connected to the respective rear end parts of the left beam 10a and the right beam 10b. The rear beam 10c extends in the vehicle width direction.

The cover frame 20 is coupled to the rear frame 10 so as to allow opening and closing. As illustrated in FIG. 4, the cover frame 20 is able to rotate respectively about a left shaft 20a and a right shaft 20b.

The left shaft 20a is a shaft member that extends in the vehicle width direction. Both ends of the left shaft 20a are fixed to a left shaft support part 10d provided to the left end part of the rear beam 10c of the rear frame 10. A lower end part of a rear frame left part 21a is inserted into the left shaft support part 10d, and the left shaft 20a passes through the lower end part of the rear frame left part 21a.

The right shaft 20b is a shaft member that extends in the vehicle width direction. Both ends of the right shaft 20b are fixed to a right shaft support part 10e provided to the right end part of the rear beam 10c of the rear frame 10. A lower end part of a rear frame right part 21b is inserted into the right shaft support part 10e, and the right shaft 20b passes through the lower end part of the rear frame right part 21b.

As illustrated in FIG. 4, the cover frame 20 rotates around the left shaft 20a and the right shaft 20b whereby the front end part of the cover frame 20 rises upward and to the rear.

The cover frame 20 has a rear frame 21, a left upper frame 22, a left lower frame 23, a first left upright frame 24a, a second left upright frame 24b, a right upper frame 25, a right lower frame 26, a first right upright frame 27a, a second right upright frame 27b, an upper frame 28, and a shield plate 29.

The rear frame 21 is disposed on the rear beam 10c of the rear frame 10. The rear frame 21 is formed overall as a U-shape. The rear frame 21 includes the rear frame left part 21a, the rear frame right part 21b, and a rear frame upper part 21c. The rear frame left part 21a is disposed on the left end part of the rear beam 10c of the rear frame 10. The lower end part of the rear frame left part 21a is rotatably coupled to the left shaft 20a. The rear frame right part 21b is disposed on the right end part of the rear beam 10c of the rear frame 10. The lower end part of the rear frame right part 21b is rotatably coupled to the right shaft 20b. The rear frame upper part 21c is joined to the respective upper end parts of the rear frame left part 21a and the rear frame right part 21b. The rear frame upper part 21c extends in the vehicle width direction.

The left upper frame 22 is attached to the rear frame left part 21a. The left upper frame 22 extends from the upper end part of the rear frame left part 21a toward the front. The left lower frame 23 is attached to the rear frame left part 21a. The left lower frame 23 extends from the lower end part of the rear frame left part 21a toward the front. The left lower frame 23 is supported by the left beam 10a of the rear frame 10 when the cover frame 20 is closed. The first left upright frame 24a and the second left upright frame 24b are respectively connected to the left upper frame 22 and the left lower frame 23. The first left upright frame 24a and the second left upright frame 24b both extend in the up-down direction. The first left upright frame 24a is disposed in front of the second left upright frame 24b.

The right upper frame 25 is attached to the rear frame right part 21b. The right upper frame 25 extends from the upper end part of the rear frame right part 21b toward the front. The right lower frame 26 is attached to the rear frame right part 21b. The right lower frame 26 extends from the lower end part of the rear frame right part 21b toward the front. The right lower frame 26 is supported by the right beam 10b of the rear frame 10 when the cover frame 20 is closed. The first right upright frame 27a and the second right upright frame 27b are respectively connected to the right upper frame 25 and the right lower frame 26. The first right upright frame 27a and the second right upright frame 27b both extend in the up-down direction. The first right upright frame 27a is disposed in front of the second right upright frame 27b.

The upper frame 28 is formed overall as a U-shape. Both end parts of the upper frame 28 are connected to the rear frame upper part 21c. The upper frame 28 is supported by the left upper frame 22 and the right upper frame 25.

The shield plate 29 is attached to the right upper frame 25. The shield plate 29 is a member for suppressing the malfunction of a sensor (not shown) due to the effects of electromagnetic waves from outside. While the type of sensor protected by the shield plate 29 is not limited in particular, the sensor may be, for example, a NOx sensor. The NOx sensor measures the concentration of NOx gas included in the exhaust gas passing through a selective catalytic reduction (SCR) device. In the present embodiment, the shield plate 29 is disposed on the right side of the sensor.

The intake pipe 15 and the exhaust pipe 16 are disposed on the cover frame 20. The intake pipe 15 and the exhaust pipe 16 are respectively supported by the left upper frame 22 and the right upper frame 25.

2. Electric Cylinder 30 and Gas Damper 40.

The electric cylinder 30 is coupled to the vehicle body frame 2 and the cover frame 20. Specifically, the electric cylinder 30 is coupled to the left beam 10a of the rear frame 10 of the vehicle body frame 2 and the rear frame left part 21a of the cover frame 20. When the electric cylinder 30 extends, the cover frame 20 transitions to an open state. When the electric cylinder 30 contracts, the cover frame 20 transitions to a closed state. The cover frame 20 constitutes the skeleton of the engine hood 6 and therefore the opening and closing of the cover frame 20 has the same meaning as the opening and closing of the engine hood 6.

The electric cylinder 30 is disposed on the left side based on the center in the vehicle width direction of the wheel loader 1. The left side in the center of the vehicle width direction is an example of a "first end side" according to the present invention. The electric cylinder 30 is positioned on the opposite side of the gas damper 40 in reference to the center in the vehicle width direction of the wheel loader 1. When opening and closing the cover frame 20, the electric cylinder 30 supports the left rear end part of the engine hood 6.

As illustrated in FIG. 4, the electric cylinder 30 has a casing 31, a screw shaft 32, and an electric motor 33. The casing 31 is formed in a cylindrical shape. A lower end part of the casing 31 is rotatably coupled to the left beam 10a of the rear frame 10. The casing 31 accommodates the screw shaft 32. The screw shaft 32 extends and contracts due to the driving power of the electric motor 33. An upper end part of the screw shaft 32 is rotatably coupled to the rear frame left part 21a. The electric motor 33 causes the screw shaft 32 to extend and contract due to electrical power supplied from a chargeable battery (not illustrated) that can be charged during the driving of the engine 11. The electric motor 33 generates driving power sufficient for the opening and closing actions of the cover frame 20.

The gas damper 40 is coupled to the vehicle body frame 2 and the cover frame 20. Specifically, the gas damper 40 is coupled to the right beam 10b of the rear frame 10 of the vehicle body frame 2 and the rear frame right part 21b of the cover frame 20.

The gas damper 40 is disposed on the right side based on the center in the vehicle width direction of the wheel loader 1. The right side in the center of the vehicle width direction is an example of a "second end side" according to the present invention. The gas damper 40 is positioned on the opposite side of the electric cylinder 30 in reference to the center in the vehicle width direction of the wheel loader 1.

The gas damper 40 according to the present embodiment constantly biases the right rear end part of the cover frame 20 regardless of whether the cover frame 20 is in the open state or closed state. Therefore, the gas damper 40 biases the right rear end part of the cover frame 20 not only when the cover frame 20 is opened and closed but also while the cover frame 20 is in the open state. Therefore, the gas damper 40 supports the cover frame 20 along with the electric cylinder 30 when the cover frame 20 is in the open state in addition to assisting the electric cylinder 30 when the cover frame 20 is opened and closed.

As illustrated in FIG. 4, the gas damper 40 has a tube 41 and a rod 42. The tube 41 is formed in a cylindrical shape. An upper end part of the tube 41 is rotatably coupled to the rear frame right part 21b. The tube 41 accommodates the rod 42. Compressed gas is sealed between the tube 41 and the rod 42. The rod 42 extends due to the counterforce of the compressed gas. The inside of the gas damper 40 is not provided with an orifice for damping the counterforce of the compressed gas. As a result, the right rear end part of the cover frame 20 continues to be urged even when the cover frame 20 is supported in the open state.

(Characteristics)

The wheel loader 1 according to the present embodiment has the vehicle body frame 2, the cover frame 20, the electric cylinder 30, and the gas damper 40. The cover frame 20 is coupled to the vehicle body frame 2 so as to allow opening and closing. The electric cylinder 30 is coupled to the vehicle body frame 2 and the cover frame 20 and is disposed on the left side based on the center in the vehicle width direction of the wheel loader 1. The gas damper 40 is coupled to the vehicle body frame 2 and the cover frame 20 and is disposed on the right side based on the center in the vehicle width direction of the wheel loader 1.

In this way, both the left and right sides of the cover frame 20 are supported by the electric cylinder 30 and the gas damper 40 and therefore the cover frame 20 assumes a twin support state in the wheel loader 1. As a result, while the cover frame 20 is open, and when the cover frame 20 is opened or closed, the occurrence of deformation of the cover frame 20 or shaking of the cover frame 20 is suppressed. Consequently, the matter of the engine hood 6 coming into contact with a peripheral member can be suppressed.

In particular, although the weight of the engine hood 6 is increased by the steps 7, the shield plate 29, and the intake pipe 15 and the like which are provided to the engine hood 6 in the present embodiment, even then deformation and shaking of the cover frame 20 can be effectively suppressed. Furthermore, although the engine hood 6 extends in the front-back direction and thus has a shape that is likely to lead to deformation or shaking of the engine hood 6 in the present embodiment, even then deformation and shaking of the cover frame 20 can be effectively suppressed.

Furthermore, the electric cylinder 30 is used as an example of a first extendable member in the present embodiment. As a result, if a battery for driving the extension and contraction is installed, the cover frame 20 can be opened or closed even if the engine 11 is stopped. In contrast, if a hydraulic cylinder, for example, were used as the first extendable member, normally the cover frame 20 could not be opened or closed if the engine 11 were not operating because the engine 11 and the hydraulic pump are stopped.

Furthermore, the gas damper 40 is used as an example of the second extendable member in the present embodiment. As a result, not only can the cover frame 20 be opened or closed even if the engine 11 is stopped, there is no need to install a battery for driving the extension and contraction. Furthermore, the cost can be suppressed in comparison to when using an electric cylinder or a hydraulic cylinder as the second extendable member.

Furthermore, the gas damper 40 in the present embodiment biases the cover frame 20 when the cover frame 20 is in the open state. Therefore, deformation or shaking of the cover frame 20 in the open state can be effectively suppressed in comparison to when using a gas damper of a type that does not impart a biasing force when in the extended state (e.g., a gas damper with an orifice).

Other Embodiments

Although an embodiment of the present invention has been described so far, the present invention is not limited to the above embodiment and various modifications may be made within the scope of the invention.

While the electric cylinder 30 in disposed on the left side and the gas damper 40 is disposed on the right side in the above embodiment, the electric cylinder 30 may be disposed on the right side and the gas damper 40 may be disposed on the left side.

(B) While the electric cylinder 30 is used as an example of the first extendable member in the above embodiment, the present invention is not limited in this way. For example, a hydraulic cylinder or a gas cylinder or the like may be used as the first extendable member.

(C) While the gas damper 40 is used as an example of the second extendable member in the above embodiment, the present invention is not limited in this way. For example, an electric cylinder or a hydraulic cylinder or the like may be used as the second extendable member. Furthermore, while no orifice is provided inside the gas damper 40 in the above embodiment, an orifice may be provided.

(D) While the front end part of the engine hood 6 is configured to be lifted upward and rearward in the above embodiment, the rear end part of the engine hood 6 may be configured to be lifted upward and forward.

(E) While the steps 7, the shield plate 29, and the intake pipe 15 and the like are provided to the engine hood 6 in the above embodiment, said members may be provided optionally.

(F) While configurations of the rear frame 10 and the cover frame 20 have been explained in the above embodiment with reference to FIGS. 2 and 4, said configurations may be changed as appropriate.

(G) While the engine hood 6 is coupled to the rear frame 10 in the above embodiment, the engine hood 6 may be coupled to the front frame 9.

(H) While the wheel loader 1 has been explained as an example of the work vehicle in the above embodiment, the structure of the engine hood 6 according to the present invention is widely applicable to other work vehicles such as a forklift and the like.

What is claimed is:

1. A work vehicle comprising:
a vehicle body frame configured to support an engine;
an engine hood having
a cover frame coupled to the vehicle body frame so as to allow opening and closing, and
an engine cover attached to the cover frame;
a first extendable member coupled to the vehicle body frame and the cover frame, the first extendable member being disposed at a first end side relative to a center in a vehicle width direction of the work vehicle; and
a second extendable member coupled to the vehicle body frame and the cover frame, the second extendable member being disposed at a second end side, the second end side being opposite the first end side relative to the center in the vehicle width direction of the work vehicle,
the first extendable member being an electric cylinder and the second extendable member being a gas damper, an inside of the gas damper not including an orifice for damping a counterforce of compressed gas.

2. The work vehicle according to claim 1, wherein the gas damper biases the cover frame when the cover frame is in an open state.

3. The work vehicle according to claim 1, wherein the vehicle body frame has a rear frame and a front frame disposed in front of the rear frame, and
the cover frame, the first extendable member and the second extendable member are each coupled to the rear frame.

4. The work vehicle according to claim 1, wherein the gas damper is configured and arranged to constantly bias a rear end part of the cover frame regardless of whether the cover frame is in an open state or a closed state.

5. A work vehicle comprising:
a vehicle body frame configured to support an engine;
an engine hood having
a cover frame coupled to the vehicle body frame so as to allow opening and closing, and
an engine cover attached to the cover frame;
a first extendable member coupled to the vehicle body frame and the cover frame, the first extendable member being disposed at a first end side relative to a center in a vehicle width direction of the work vehicle; and
a second extendable member coupled to the vehicle body frame and the cover frame, the second extendable member being disposed at a second end side, the second end side being opposite the first end side relative to the center in the vehicle width direction of the work vehicle,
the first extendable member being an electric cylinder and the second extendable member being a gas damper, and
a position where the first extendable member couples to the vehicle body frame being farther from the cover frame than a position where the second extendable member couples to the vehicle body frame.

6. The work vehicle according to claim 5, wherein an inside of the gas damper is not provided with an orifice for damping a counterforce of compressed gas.

* * * * *